Aug. 4, 1959   C. L. GRAHAM   2,898,588
ATTACK DEVIATION DEVICE
Filed Feb. 23, 1955

INVENTOR:
Connelly L. Graham
By Herbert E. Metcalf
His Patent Attorney

United States Patent Office 2,898,588
Patented Aug. 4, 1959

2,898,588

ATTACK DEVIATION DEVICE

Connelly L. Graham, Covina, Calif., assignor to Northrop Corporation, Hawthorne, Calif., a corporation of California Application February 23, 1955, Serial No. 489,843

5 Claims. (Cl. 343—18)

This invention has to do with targets to be towed by aircraft but more particularly it has to do with a target to reflect radar signals to a greater degree than that of a towing aircraft.

With the introduction of radar as a means of tracking moving objects, such as aircraft, and coordinating the operation of ground and aerial artillery for destroying the aircraft, an increasingly important problem is the method of upsetting radar to such an extent that signals are not reflected from a true target and the ultimate destruction thereof cannot be obtained.

The principal object of this invention is to provide an attack deviation device in the nature of a target to be towed behind an aircraft that will reflect radar signals to a greater degree than the towing aircraft and cause automatic follow-up ground and aerial artillery to track the trailed target, in an effort to destroy the same, rather than the aircraft.

Another object of this invention is to provide an attack deviation device that can readily be stowed in a relatively small container secured to the aircraft and that may be used, if desired and desirable, more than once or as many time as is convenient.

Figure 1:
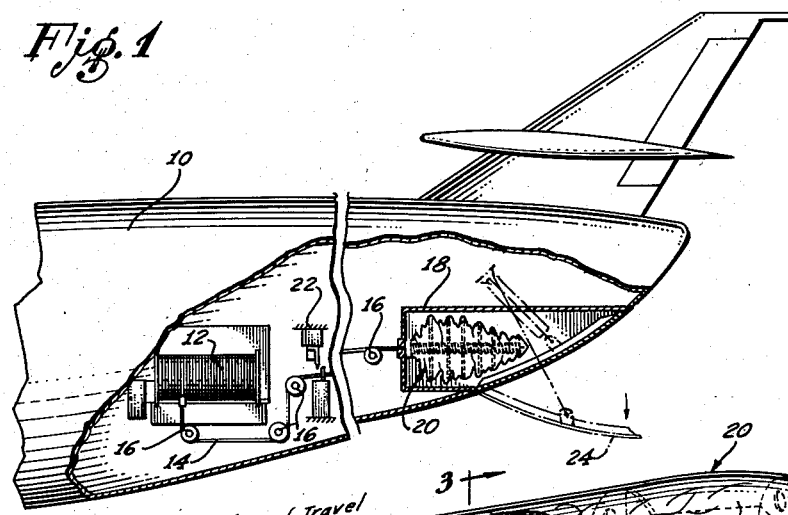
Figure 1 is a fragmentary, schematic view illustrating and having embodied therein the present invention as it is stowed in a container in an aircraft.

Referring to the drawings for a more detailed description of the present invention, 10 designates an aircraft having a hydraulically or pneumatically actuated tow reel 12 attached thereto; the cable 14, made of nylon or other equally applicable material, is threaded over a number of quadrants 16. One end of the cable 14 passes through an opening in a container 18 and is interconnected to one end of a radar target, broadly designated 20, being in the nature of a collapsible tow target sleeve or the like. Between the container 18 and the reel 12 is a hydraulically or pneumatically actuated cutter 22 that has for its purpose the cutting of the cable 14 in the event such action is considered expedient. The aircraft 10 has as a part thereof a hydraulically or pneumatically actuated door 24 thereon for opening and closing the container 18.

The target 20 per se comprises a collapsible outer covering, or skin 26 of nylon fabric or other equally applicable material. The cable 14 is secured to the target 20 through the medium of a ring 28 having a number of lines 30 thereon that are also secured on each side of opening 32 that is in the leading end of the target 20 in order that ram air may pass thereinto. The trailing end of the target 20 also has an opening 34 therein out through which the ram air may pass.

Equally spaced throughout the interior of the target 20, secured to the covering or skin 26, and lying in parallel planes, are a plurality of circular diaphragms 36. The diaphragms 36 may be made of the same material as the covering 26 or be made of metal or equally applicable material. Each diaphragm has a plurality of openings 38 therethrough through which ram air passes and has passage from opening 32 to opening 34. Each side of each diaphragm 36 is coated with foil 35 or other equally highly reflective material that will reflect radar signals. Also each diaphragm 36 has a central opening 40 therethrough to accommodate a compression spring 42 that is secured to the ring 28 at the leading end of the target 20 and secured to the target 20 per se at the trailing end.

Figure 2:
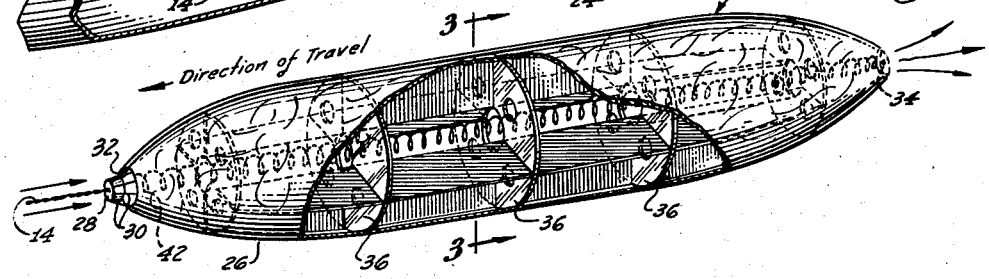
Figure 2 is a fragmentary view of the invention as it is inflated in the towed condition, parts being broken away for purposes of obtaining clarity.
Figure 4:
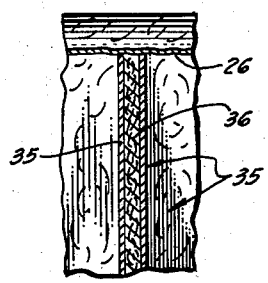
Figure 4 is an enlarged, fragmentary, cross-sectional view taken on line 4—4 in Figure 3 looking in the direction indicated.
Figure 3:
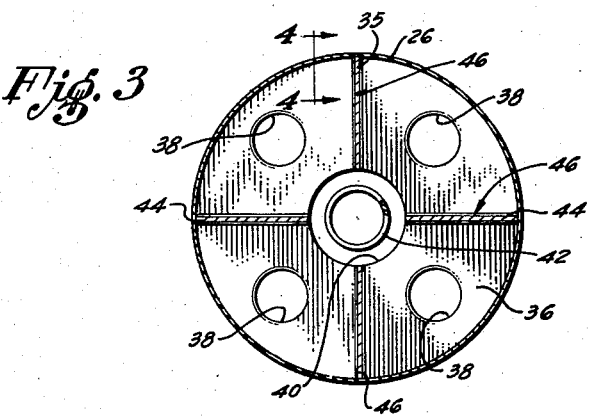
Figure 3 is a cross-sectional view taken on line 3—3 in Figure 2 looking in the direction indicated.

Secured to and spanning the distance between each diaphragm 36 are foil coated horizontal panels 44, as the target 20 is viewed in Figure 2 of the drawings. Also secured to and spanning the distance between each diaphragm 36 are vertical panels 46 which are also coated with foil 35 or other highly reflective and equally applicable material. The horizontal and vertical panels 44 and 46 may be made of the same material as the covering 26.

The operation of the attack deviation device is as follows: Assume the conditions to be those illustrated in Figure 1 of the drawings. The target 20 is in the container 18 in the collapsed condition for the reason that the spring 42 is compressed and has no forces working in opposition thereto. When it is desired to trail the target 20 the door 24 is actuated as well as the reel 12 and the target is reeled out of the container 18. When the target 20 is free of the container 18, ram air enters through opening 32, passes through openings 38 in diaphragms 36 and out opening 34. This action of the ram air causes there to be a force in opposition to the spring 42 which results in extending the latter, as may be seen in Figure 2 of the drawings, and inflating the target. With the panels 44 and 46 and diaphragms 36 fully extended, a maximum amount of radar reflection surface is exposed to cause deviation of a radar signal. When the radar sweeps the area in which is located the aircraft and target, the greater signal will be returned by the target 20 than the aircraft 10. Due to this result, ground controlled or air controlled artillery will be guided, through radar, to the target 20 instead of the aircraft 10.

When there is no longer any use for the target 20 it may be reeled back into its container 18 and again assume the condition illustrated in Figure 1 of the drawings. In the event of an emergency, cutter 22 may be actuated to sever the cable 14 and release the target 20.

It is to be understood that the target 20 is to be trailed a sufficient distance from the aircraft 10, otherwise the radar signals reflecting from the target 20 and aircraft 10 will merge into one large signal which is obviously opposite to the desired result.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. An attack deviation device comprising a hollow, elongated member to be towed behind an aircraft; said member being made of a flexible material; a towline attached to one end of said member and to said aircraft; a resilient means attached to that end of the towline attached to said member and to the member for collapsing the latter when not in use; and structure in the member for reflecting radar signals impinging thereon, 2. An attack deviation device comprising a hollow, elongated member to be towed behind an aircraft; said member being made of a flexible material; a towline attached to one end of said member and to said aircraft; a resilient means attached to that end of the towline attached to said member and to the member for collapsing the latter when not in use; and structure in the member for reflecting radar signals impinging thereon; said member having an air passage therethrough to inflate said member when being towed.

3. An attack deviation device comprising a hollow, elongated member to be towed behind an aircraft; said member being made of a flexible material; a towline attached to one end of said member and to said aircraft; a resilient means attached to that end of the towline attached to said member and to the member for collapsing the latter when not in use; and structure in the member for reflecting radar signals impinging thereon; said structure including at least one panel.

4. An attack deviation device comprising a hollow, elongated member to be towed behind an aircraft; said member being made of a flexible material; a towline attached to one end of said member and to said aircraft; a resilient means attached to that end of the towline attached to said member and to the member for collapsing the latter when not in use; and structure in the member for reflecting radar signals impinging thereon; said structure including at least one diaphragm.

5. An attack deviation device comprising a hollow, elongated member to be towed behind an aircraft; said member being made of a flexible material; a towline attached to one end of said member and to said aircraft; a resilient means attached to that end of the towline attached to said member and to the member for collapsing the latter when not in use; and structure in the member for reflecting radar signals impinging thereon; said structure having a high reflecting radar coating thereon.

References Cited in the file of this patent

UNITED STATES PATENTS

| | | |
|---|---|---|
| 1,893,149 | Picco | Jan. 3, 1933 |
| 2,419,549 | Griesinger et al. | Apr. 29, 1947 |
| 2,619,303 | Martin | Nov. 25, 1952 |
| 2,778,010 | Leonard | Jan. 15, 1957 |
| 2,780,806 | Alstyne | Feb. 5, 1957 |